(12) United States Patent
Jung et al.

(10) Patent No.: US 12,481,135 B2
(45) Date of Patent: Nov. 25, 2025

(54) OPTICAL IMAGING SYSTEM

(71) Applicant: SAMSUNG ELECTRO-MECHANICS CO., LTD., Suwon-si (KR)

(72) Inventors: Phil Ho Jung, Suwon-si (KR); Ho Sik You, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/467,013

(22) Filed: Sep. 14, 2023

(65) Prior Publication Data

US 2023/0418033 A1 Dec. 28, 2023

Related U.S. Application Data

(63) Continuation of application No. 16/394,083, filed on Apr. 25, 2019, now Pat. No. 11,796,763.

(30) Foreign Application Priority Data

Jul. 2, 2018 (KR) .......................... 10-2018-0076470

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............. G02B 13/001; G02B 13/0015; G02B 13/002; G02B 13/0045; G02B 9/00;
(Continued)

(56) References Cited

U.S. PATENT DOCUMENTS 8,599,495 B1 12/2013 Tsai et al.
10,191,248 B2 1/2019 Hashimoto
(Continued)

FOREIGN PATENT DOCUMENTS

CN 103529539 A 1/2014
CN 204832662 U 12/2015
(Continued)

OTHER PUBLICATIONS

Gross et al. "Handbook of Optical Systems Volume 3: Aberration Theory and Correction of Optical Systems" Weinheim Germany, WILEY-VCH Verlag GmbH & Co. KGaA, pp. 377-379 (Year: 2007).*

(Continued)

*Primary Examiner* — Marin Pichler
(74) *Attorney, Agent, or Firm* — NSIP Law

(57) ABSTRACT

An optical imaging system includes a first lens having positive refractive power and having a convex object-side surface; a second lens having negative refractive power; a third lens having refractive power; a fourth lens having refractive power; a fifth lens having refractive power; a sixth lens having positive refractive power and having a convex image-side surface; and a seventh lens having negative refractive power and having a concave image-side surface, and the first to seventh lenses are disposed in order from an object side. In the optical imaging system, 1<f/f6 and V2<40, where f is a focal length of the optical imaging system, f6 is a focal length of the sixth lens, and V2 is an Abbe number of the second lens.

15 Claims, 8 Drawing Sheets

(58) Field of Classification Search
CPC . G02B 9/64; G02B 9/62; G02B 1/041; G02B 27/0025
USPC .......................................... 359/708, 713, 755
See application file for complete search history.

(56) References Cited

U.S. PATENT DOCUMENTS

| | | |
|---|---|---|
| 10,228,541 B1 | 3/2019 | Shi et al. |
| 10,234,657 B1 | 3/2019 | Shi et al. |
| 10,330,892 B2 | 6/2019 | Hashimoto |
| 10,795,125 B2 | 10/2020 | Zhao et al. |
| 2014/0139719 A1 | 5/2014 | Fukaya |
| 2014/0253782 A1 | 9/2014 | Tsai et al. |
| 2015/0168695 A1 | 6/2015 | Tsai et al. |
| 2015/0198791 A1 | 7/2015 | Kubota et al. |
| 2015/0378131 A1 | 12/2015 | Tang et al. |
| 2016/0033742 A1 | 2/2016 | Huang |
| 2016/0072403 A1 | 3/2016 | Niwa |
| 2016/0124191 A1 | 5/2016 | Hashimoto |
| 2017/0219798 A1 | 8/2017 | Park |
| 2017/0329108 A1 | 11/2017 | Hashimoto |
| 2017/0357081 A1 | 12/2017 | Dai et al. |
| 2018/0172956 A1 | 6/2018 | Son |
| 2019/0121088 A1 | 4/2019 | Shi et al. |
| 2019/0121089 A1 | 4/2019 | Fang et al. |
| 2019/0121100 A1 | 4/2019 | Song et al. |
| 2019/0146184 A1* | 5/2019 | Xu .................... G02B 27/0025 359/755 |

FOREIGN PATENT DOCUMENTS

| | | |
|---|---|---|
| CN | 106950681 A | 7/2017 |
| CN | 107015343 A | 8/2017 |
| CN | 107367827 A | 11/2017 |
| CN | 107621683 A | 1/2018 |
| CN | 107942483 A | 4/2018 |
| CN | 108205187 A | 6/2018 |
| JP | 2015-72403 A | 4/2015 |
| JP | 2017-116594 A | 6/2017 |

OTHER PUBLICATIONS

Chinese Office Action dated Apr. 27, 2021 issued in counterpart Chinese Patent Application No. 201910585326.8. (7 pages in English and 7 pages in Chinese).

Chinese Office Action issued on Apr. 24, 2022, in the corresponding Chinese Patent Application No. 201910585326.8. (9 pages in English and 8 pages in Chinese).

Korean Office Action issued on Sep. 25, 2024, in counterpart Korean Patent Application No. 10-2018-0076470 (6 pages in English, 5 pages in Korean).

Chinese Office Action issued on Feb. 25, 2025, in corresponding Chinese Patent Application No. 202211265231.6. (4pages in English, 6pages in Chinese).

Chinese Office Action issued on Mar. 5, 2025, in corresponding Chinese Patent Application No. 202211265220.8. (4pages in English, 6pages in Chinese).

* cited by examiner

OPTICAL IMAGING SYSTEM

CROSS-REFERENCE TO RELATED APPLICATION

This application is a Continuation Application of U.S. patent application Ser. No. 16/394,083, filed on Apr. 25, 2019, now U.S. Pat. No. 11,796,763 issued on Oct. 24, 2023, which claims the benefit under 35 USC 119(a) of Korean Patent Application No. 10-2018-0076470 filed on Jul. 2, 2018, in the Korean Intellectual Property Office, the entire disclosures of which are incorporated herein by reference for all purposes.

BACKGROUND

1. Field

The following description relates to an optical imaging system including seven lenses.

2. Description of Background

Generally, small-sized cameras are mounted on wireless terminal devices. For example, a small-sized camera is generally mounted on the front and the rear of a wireless terminal device. Such small-sized cameras are used for imaging outdoor scenery, people indoors, and the like, and thus, small-sized cameras are required to have performance similar to that of general cameras. However, as there is a limitation in mounting space of a small-sized camera in a wireless terminal device due to a size of the wireless terminal device, it may be difficult to implement high performance. Thus, it has been necessary to develop an optical imaging system which can improve performance of a small-sized camera without increasing a size of the camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having positive refractive power and having a convex object-side surface; a second lens having negative refractive power; a third lens having refractive power; a fourth lens having refractive power; a fifth lens having refractive power; a sixth lens having positive refractive power and having a convex image-side surface; and a seventh lens having negative refractive power and having a concave image-side surface. The first to seventh lenses may be disposed in order from an object side. In the optical imaging system, $1<f/f6$ and $V2<40$, where f is a focal length of the optical imaging system, f6 is a focal length of the sixth lens, and V2 is an Abbe number of the second lens.

An F No. of the optical imaging system may be 1.8 or less.

The optical imaging system may satisfy $0.05<OAL/HFOV<0.3$, where OAL is a distance from an object-side surface of the first lens to an imaging plane, and HFOV is a half field of view of the optical imaging system.

The optical imaging system may satisfy $0.2<Th7/Th6<0.9$, where Th6 is a thickness of the sixth lens at an optical center, and Th7 is a thickness of the seventh lens at an optical center.

The fourth lens may have negative refractive power.

The optical imaging system may include a stop disposed between the first lens and the second lens.

The fifth lens may include an inflection point on one or both of an object-side surface and an image-side surface of the fifth lens.

The sixth lens may include an inflection point on one or both of an object-side surface and an image-side surface of the sixth lens.

The seventh lens may include an inflection point on one or both of an object-side surface and an image-side surface of the seventh lens.

In another general aspect, an optical imaging system includes a first lens, a second lens, a third lens, a fourth lens, a fifth lens, a sixth lens, and a seventh lens disposed in order from an object side. In the optical imaging system, F No.$<1.8$ and $V2<40$, where V2 is an Abbe number of the second lens.

The third lens may have positive refractive power.

The fourth lens may have negative refractive power.

The fifth lens may have positive refractive power.

The third lens may include a convex object-side surface.

The fourth lens may include a concave object-side surface.

The fifth lens, the sixth lens, and the seventh lens may each include an inflection point on one or both of a respective object-side surface and a respective image-side surface.

In another general aspect, an optical imaging system includes a first lens, a second lens, a third lens, a fourth lens, a fifth lens, a sixth lens, and a seventh lens sequentially disposed from an object side to an image side. In the optical imaging system, the fourth lens includes one convex surface and one concave surface, and F No.$<1.8$.

The fourth lens may include a concave object-side surface and a convex image-side surface.

The fourth lens may include a convex object-side surface and a concave image-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
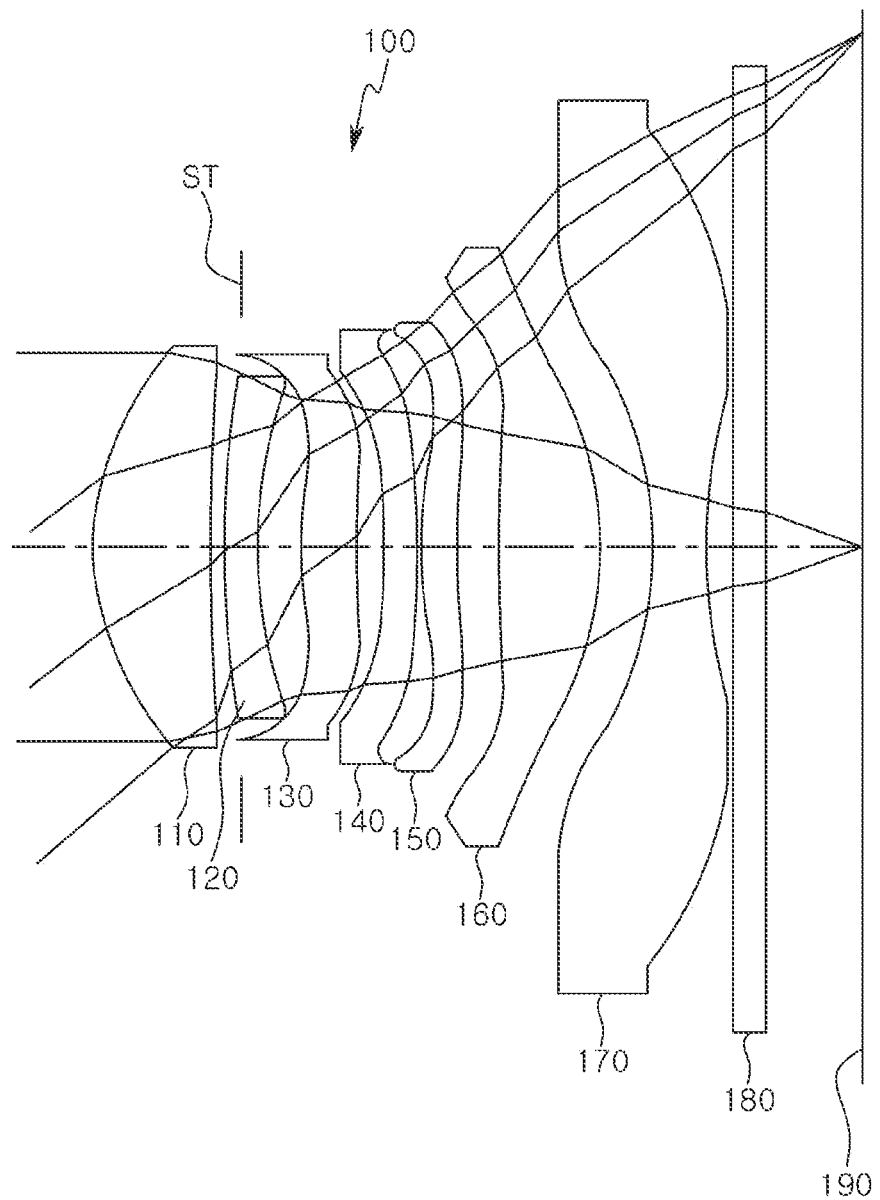
FIG. 1 is a diagram illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

In the examples, a first lens may refer to a lens disposed most adjacent to an object (or a subject), and a seventh lens may refer to a lens disposed most adjacent to an imaging plane (or an image sensor). In the examples, an entirety of a radius of curvature, a thickness, an OAL (a distance from an object-side surface of the first lens to the imaging plane), an ImgH (½ of an diagonal length of the imaging plane) and a focal length of a lens are indicated in millimeters (mm).

A thickness of a lens, a gap between lenses, and the OAL may be distances at an optical axis of a lens. In a description of a form of a lens, a surface of a lens being convex indicates that a paraxial region of the surface is convex, while a surface of a lens being concave indicates that a paraxial region of the surface is concave. Therefore, in a configuration in which a surface of a lens is described as being convex, an edge region of the lens may be concave. In a similar manner, in a configuration in which a surface of a lens is described as being concave, an edge region of the lens may be convex.

An optical imaging system may include seven lenses. For example, the optical imaging system may include a first lens, a second lens, a third lens, a fourth lens, a fifth lens, a sixth lens, and a seventh lens. The first to seventh lenses may be disposed with certain gaps. For example, image-side surfaces and object-side surfaces of adjacent lenses may not be in contact with each other.

The first lens may have refractive power. For example, the first lens may have positive refractive power. The first lens may have a convex surface. For example, the first lens may have a convex object-side surface.

The first lens may include an aspherical surface. For example, both surfaces of the first lens may be aspherical. The first lens may be made of a material having high light transmissivity and excellent workability. For example, the first lens may be made of a plastic material. The first lens may have a relative low refractive index. For example, a refractive index of the first lens may be less than 1.6.

The second lens may have refractive power. For example, the second lens may have negative refractive power. The second lens may have a convex surface. For example, the second lens may have a convex object-side surface.

The second lens may include an aspherical surface. For example, an object-side surface of the second lens may be spherical. The second lens may be made of a material having high light transmissivity and excellent workability. For example, the second lens may be made of a plastic material.

The second lens may have a refractive index higher than a refractive index of the first lens. For example, a refractive index of the second lens may be 1.65 or higher.

The third lens may have refractive power. For example, the third lens may have positive refractive power or negative refractive power. The third lens may have a convex surface. For example, the third lens may have a convex object-side surface.

The third lens may include an aspherical surface. For example, an image-side surface of the third lens may be aspherical. The third lens may be made of a material having high light transmissivity and excellent workability. For example, the third lens may be made of a plastic material. The third lens may have a refractive index approximately similar to a refractive index of the first lens. For example, a refractive index of the third lens may be less than 1.6.

The fourth lens may have refractive power. For example, the fourth lens may have negative refractive power. The fourth lens may have a concave surface. For example, an object-side surface or an image-side surface of the fourth lens may be concave.

The fourth lens may include an aspherical surface. For example, both surfaces of the fourth lens may be aspherical. The fourth lens may be made of a material having high light transmissivity and excellent workability. For example, the fourth lens may be made of a plastic material. The fourth lens may have a refractive index higher than a refractive index of the first lens. For example, a refractive index of the fourth lens may be 1.6 or higher.

The fifth lens may have refractive power. For example, the fifth lens may have positive refractive power or negative refractive power. The fifth lens may have a convex surface. For example, an object-side surface of the fifth lens may be convex. The fifth lens may have a shape having an inflection point. For example, an inflection point may be formed on at least one of an object-side surface and an image-side surface of the fifth lens.

The fifth lens may include an aspherical surface. For example, both surfaces of the fifth lens may be aspherical. The fifth lens may be made of a material having high light transmissivity and excellent workability. For example, the fifth lens may be made of a plastic material. The fifth lens may have a refractive index approximately similar to a refractive index of the fourth lens. For example, a refractive index of the fifth lens may be 1.6 or higher.

The sixth lens may have refractive power. For example, the sixth lens may have positive refractive power. The sixth lens may have at least one convex surface. For example, an object-side surface or an image-side surface of the sixth lens may be convex, or both surfaces of the sixth lens may be convex. The sixth lens may have a shape having an inflection point. For example, an inflection point may be formed on at least one of an object-side surface and an image-side surface of the sixth lens.

The sixth lens may include an aspherical surface. For example, both surfaces of the sixth lens may be aspherical. The sixth lens may be made of a material having high light transmissivity and excellent workability. For example, the sixth lens may be made of a plastic material. The sixth lens may have a refractive index lower than a refractive index of the fifth lens. For example, a refractive index of the sixth lens may be less than 1.6.

The seventh lens may have refractive power. For example, the seventh lens may have negative refractive power. The seventh lens may have at least one concave surface. For example, an object-side surface or an image-side surface of the seventh lens may be concave, or both surfaces of the seventh lens may be concave. The seventh lens may have a shape having an inflection point. For example, an inflection point may be formed on at least one of an object-side surface and an image-side surface of the seventh lens.

The seventh lens may include an aspherical surface. For example, both surfaces of the seventh lens may be aspherical. The seventh lens may be made of a material having high light transmissivity and excellent workability. For example, the seventh lens may be made of a plastic material. The seventh lens may have a refractive index approximately similar to a refractive index of the sixth lens. For example, a refractive index of the seventh lens may be less than 1.6.

The aspherical surfaces of the first to seventh lenses may be represented by Equation 1 below.

$$Z = \frac{cr^2}{1+\sqrt{1-(1+k)c^2r^2}} + Ar^4 + Br^6 * Cr^8 * Dr^{10} + Er^{12} + Fr^{14} + Gr^{16} + Hr^{18} + Jr^{20} \quad \text{Equation 1}$$

In Equation 1, "c" is an inverse of a radius of a curvature of a respective lens, "K" is a conic constant, "r" is a distance from a certain point on an aspherical surface of the lens to an optical axis, "A" to "H" are aspheric constants, and "Z" (or SAG) is a height from a certain point on an aspherical surface of the lens to an apex of the aspherical surface in an optical axis direction.

The optical imaging system may further include a filter, an image sensor, and a stop.

The filter may be disposed between the seventh lens and an image sensor. The filter may block light having a certain wavelength. For example, the filter may block light having an infrared wavelength.

The image sensor may form an imaging plane. For example, a surface of the image sensor may form the imaging plane.

The stop may be disposed to adjust the amount of light incident to a lens. For example, the stop may be disposed between the first lens and the second lens or between the second lens and the third lens.

The optical imaging system may satisfy conditional expressions below:

| | |
|---|---|
| $1.0 < f/f6$ | (Conditional Expression 1) |
| $V2 < 40$ | (Conditional Expression 2) |
| $F\ No. < 1.8$ | (Conditional Expression 3) |
| $0.05 < OAL/HFOV < 0.3$ | (Conditional Expression 4) |
| $0.2 < Th6/Th7 < 0.9$ | (Conditional Expression 5) |

In the conditional expressions, "f" is a length of the optical imaging system, "f6" is a focal length of the sixth lens, "V2" is an Abbe number of the second lens, "OAL" is a distance from an object-side surface of the first lens to an imaging plane, "HFOV" is a half field of view of the optical imaging system, "Th6" is a thickness of the sixth lens at an optical center, and "Th7" is a thickness of the seventh lens at an optical center.

In the description below, an optical imaging system will be described in accordance with examples.

embodiment first example of an optical imaging system will be described with reference to FIG. 1.

The optical imaging system 100 may include a first lens 110, a second lens 120, a third lens 130, a fourth lens 140, a fifth lens 150, a sixth lens 160, and a seventh lens 170.

The first lens 110 may have positive refractive power, and may have a convex object-side surface and a concave image-side surface. The second lens 120 may have negative refractive power, and may have a convex object-side surface and a concave image-side surface. The third lens 130 may have positive refractive power, and may have a convex object-side surface and a concave image-side surface. The fourth lens 140 may have negative refractive power, and may have a concave object-side surface and a convex image-side surface. The fifth lens 150 may have positive refractive power, and may have a convex object-side surface and a concave image-side surface. The fifth lens 150 may have a shape in which an inflection point is formed on an object-side surface and an image-side surface of the fifth lens 150. The sixth lens 160 may have positive refractive power, and may have a convex object-side surface and a convex image-side surface. The sixth lens 160 may have a shape in which an inflection point is formed on an object-side surface and an image-side surface of the sixth lens 160. The seventh lens 170 may have negative refractive power, and may have a concave object-side surface and a concave image-side surface. The seventh lens 170 may have a shape in which an inflection point is formed on an object-side surface and an image-side surface of the seventh lens 170.

The optical imaging system 100 may further include a filter 180, an image sensor 190, and a stop ST. The filter 180 may be disposed between the seventh lens 170 and the image sensor 190, and the stop ST may be disposed between the first lens 110 and the second lens 120.

The optical imaging system 100 may include a plurality of lenses having relatively high refractive indexes. For example, the second lens 120, the fourth lens 140, and the fifth lens 150 may have a refractive index of 1.6 or higher.

Figure 2:
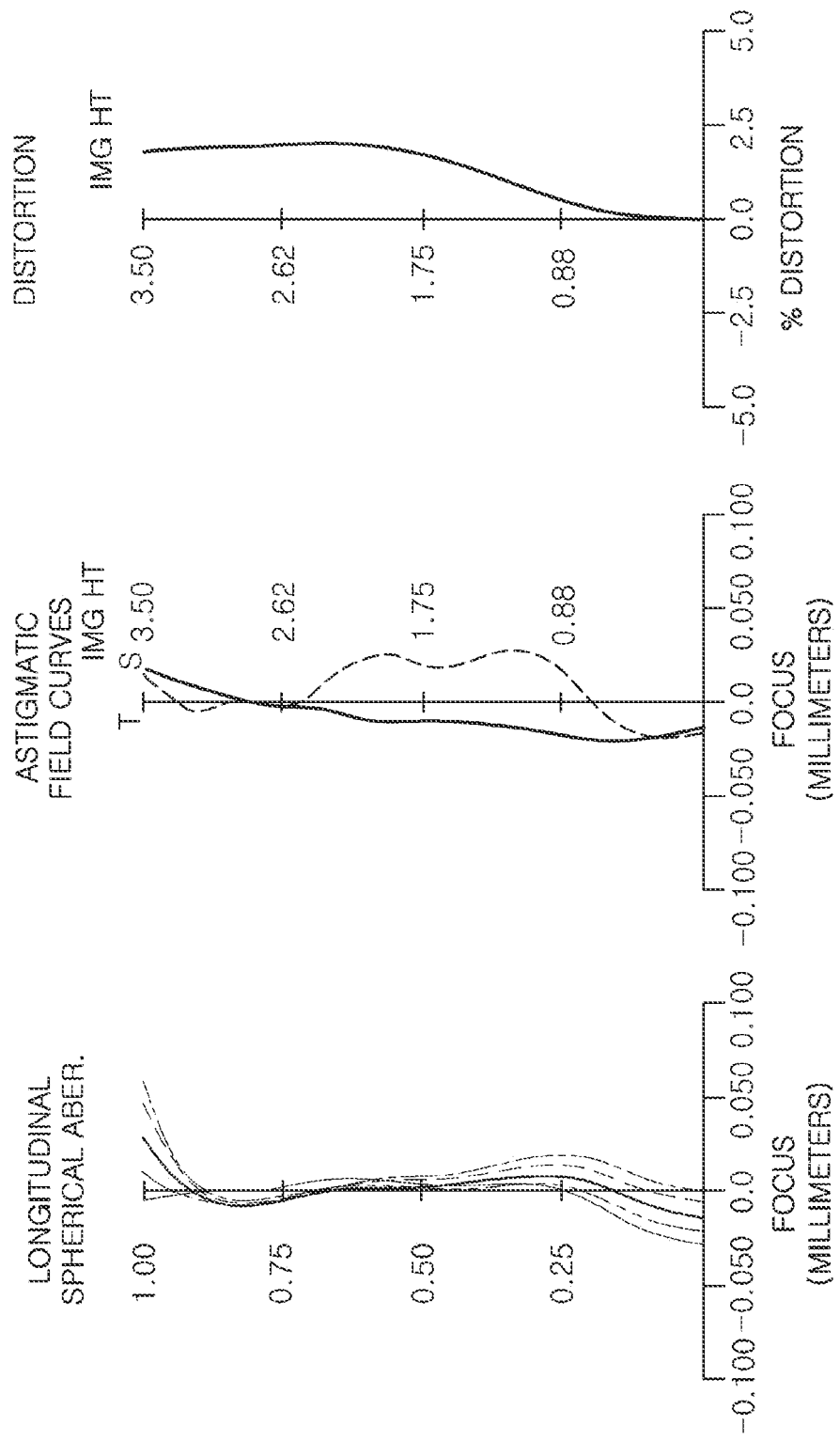
FIG. 2 illustrates aberration curves of the optical imaging system illustrated in FIG. 1.

The optical imaging system 100 may have aberration characteristics as illustrated in FIG. 2. Table 1 lists characteristics of the lenses of the optical imaging system 100. In the optical imaging system 100 of FIG. 1, a focal length is 4.210, and a total field of view is 78.8.

Figure 3:
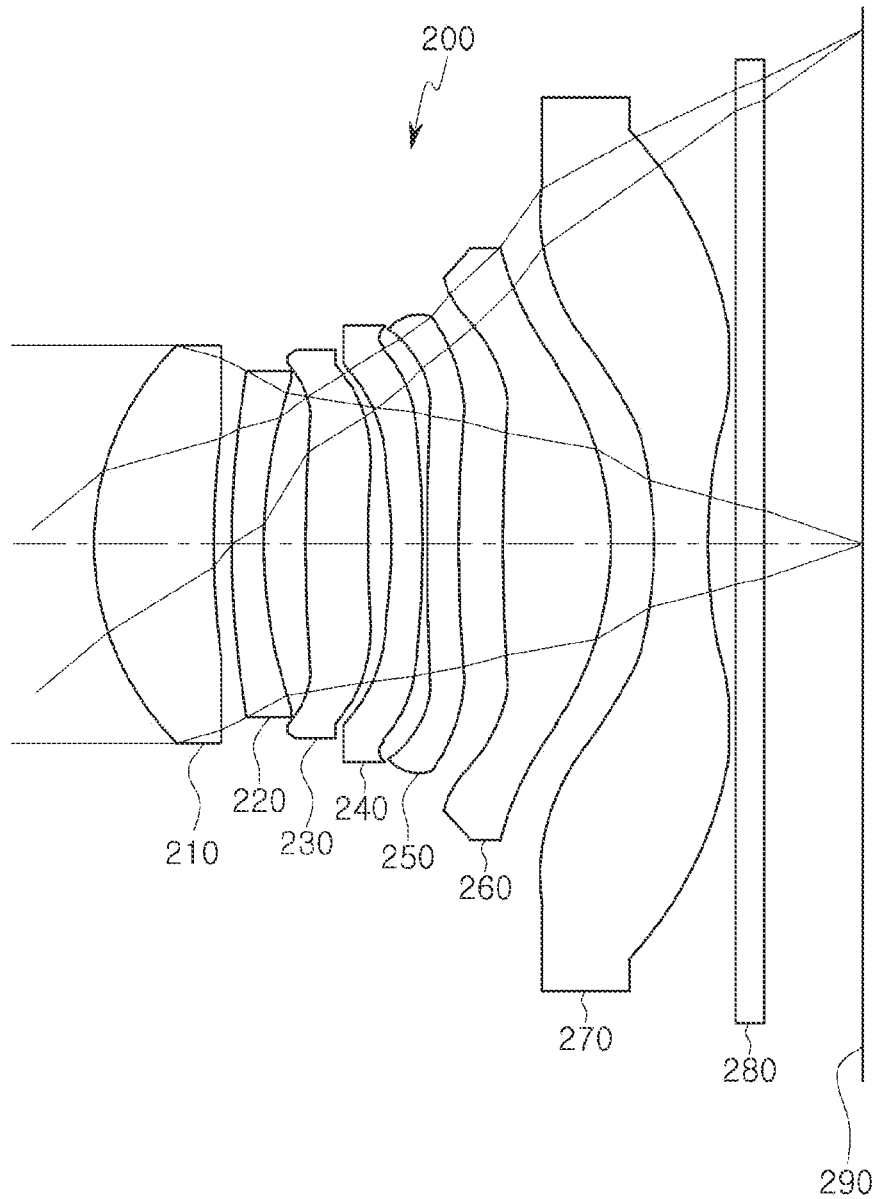
FIG. 3 is a diagram illustrating a second example of an optical imaging system.

A second example of an optical imaging system will be described with reference to FIG. 3.

The optical imaging system 200 may include a first lens 210, a second lens 220, a third lens 230, a fourth lens 240, a fifth lens 250, a sixth lens 260, and a seventh lens 270.

The first lens 210 may have positive refractive power, and may have a convex object-side surface and a concave image-side surface. The second lens 220 may have negative refractive power, and may have a convex object-side surface and a concave image-side surface. The third lens 230 may have positive refractive power, and may have a convex object-side surface and a concave image-side surface. The fourth lens 240 may have negative refractive power, and may have a concave object-side surface and a convex image-side surface. The fifth lens 250 may have positive refractive power, and may have a convex object-side surface and a concave image-side surface. The fifth lens 250 may have a shape in which an inflection point is formed on an object-side surface and an image-side surface of the fifth lens 250. The sixth lens 260 may have positive refractive power, and may have a convex object-side surface and a convex image-side surface. The sixth lens 260 may have a shape in which an inflection point is formed on an object-side surface and an image-side surface of the sixth lens 260. The seventh lens 270 may have negative refractive power, and may have a concave object-side surface and a concave image-side surface. The seventh lens 270 may have a shape in which an inflection point is formed on an object-side surface and an image-side surface of the seventh lens 270.

The optical imaging system 200 may further include a filter 280, an image sensor 290, and a stop ST. The filter 280 may be disposed between the seventh lens 270 and the image sensor 290, and the stop ST may be disposed between the first lens 210 and the second lens 220.

The optical imaging system 200 may include a plurality of lenses having relatively high refractive indexes. For example, the second lens 220, the fourth lens 240, and the fifth lens 250 may have a refractive index of 1.6 or higher.

Figure 4:
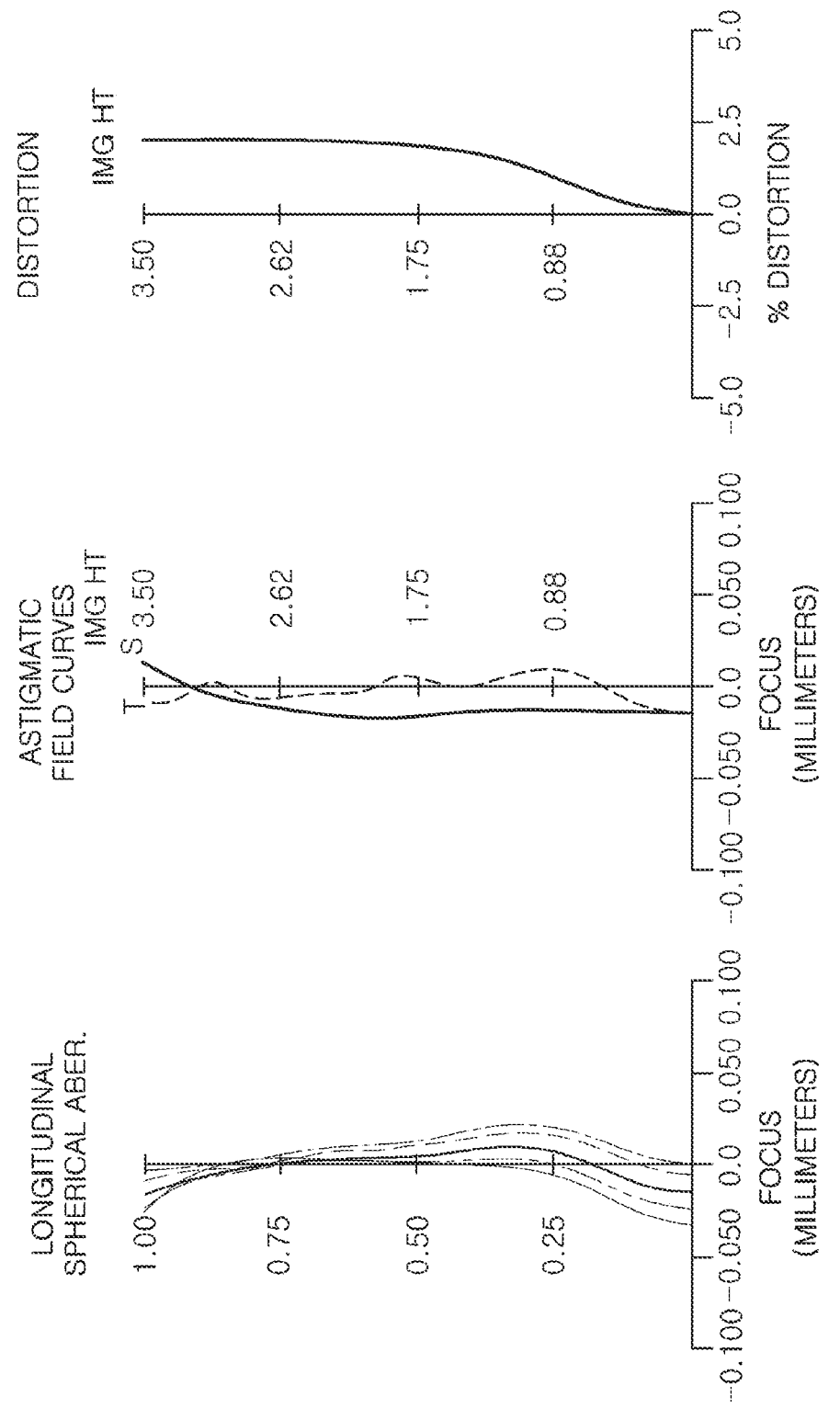
FIG. 4 illustrates aberration curves of the optical imaging system illustrated in FIG. 3.

The optical imaging system 200 may have aberration characteristics as illustrated in FIG. 4. Table 2 lists characteristics of the lenses of the optical imaging system 200. In the optical imaging system 200 of FIG. 3, a focal length is 4.220, and a total field of view is 78.5.

TABLE 1

| Surface No. | Note | Radius of Curvature | Thickness/ Distance | Refractive Index | Abbe No. | Focal Length |
|---|---|---|---|---|---|---|
| 1 | First Lens | 1.834 | 0.835 | 1.544 | 56.1 | 4.290 |
| 2 | | 7.092 | 0.071 | | | |
| 3 (Stop) | Second Lens | 4.808 | 0.200 | 1.671 | 19.25 | -12.58 |
| 4 | | 3.022 | 0.339 | | | |
| 5 | Third Lens | 10.000 | 0.385 | 1.544 | 56.1 | 20.468 |
| 6 | | 93.878 | 0.144 | | | |
| 7 | Fourth Lens | -6.012 | 0.210 | 1.633 | 23.9 | -10.86 |
| 8 | | -45.022 | 0.058 | | | |
| 9 | Fifth Lens | 2.511 | 0.240 | 1.633 | 23.9 | 70.833 |
| 10 | | 2.559 | 0.319 | | | |
| 11 | Sixth Lens | 9.014 | 0.653 | 1.544 | 56.1 | 2.343 |
| 12 | | -1.453 | 0.360 | | | |
| 13 | Seventh Lens | -3.013 | 0.370 | 1.544 | 56.1 | -2.095 |
| 14 | | 1.924 | 0.186 | | | |
| 15 | Filter | Infinity | 0.210 | 1.517 | 64.2 | |
| 16 | | Infinity | 0.660 | | | |
| 17 | Imaging Plane | Infinity | | | | |

TABLE 2

| Surface No. | Note | Radius of Curvature | Thickness/ Distance | Refractive Index | Abbe No. | Focal Length |
|---|---|---|---|---|---|---|
| 1 | First Lens | 1.812 | 0.835 | 1.544 | 56.1 | 4.268376 |
| 2 | | 6.820 | 0.113 | | | |
| 3 (Stop) | Second Lens | 4.68264 | 0.200 | 1.671 | 19.25 | -12.69996 |
| 4 | | 2.980 | 0.327 | | | |
| 5 | Third Lens | 10.000 | 0.410 | 1.544 | 56.1 | 22.384065 |
| 6 | | 54.244 | 0.135 | | | |
| 7 | Fourth Lens | -6.109 | 0.210 | 1.633 | 23.9 | -13.34233 |
| 8 | | -21.731 | 0.039 | | | |
| 9 | Fifth Lens | 2.88075 | 0.240 | 1.633 | 23.9 | 62.169594 |
| 10 | | 3.00452 | 0.307 | | | |
| 11 | Sixth Lens | 8.647 | 0.704 | 1.544 | 56.1 | 2.434597 |
| 12 | | -1.525 | 0.303 | | | |
| 13 | Seventh Lens | -3.741 | 0.370 | 1.544 | 56.1 | -2.083672 |
| 14 | | 1.692 | 0.177 | | | |
| 15 | Filter | Infinity | 0.210 | 1.517 | 64.2 | |
| 16 | | Infinity | 0.660 | | | |
| 17 | Imaging Plane | Infinity | | | | |

Figure 5:
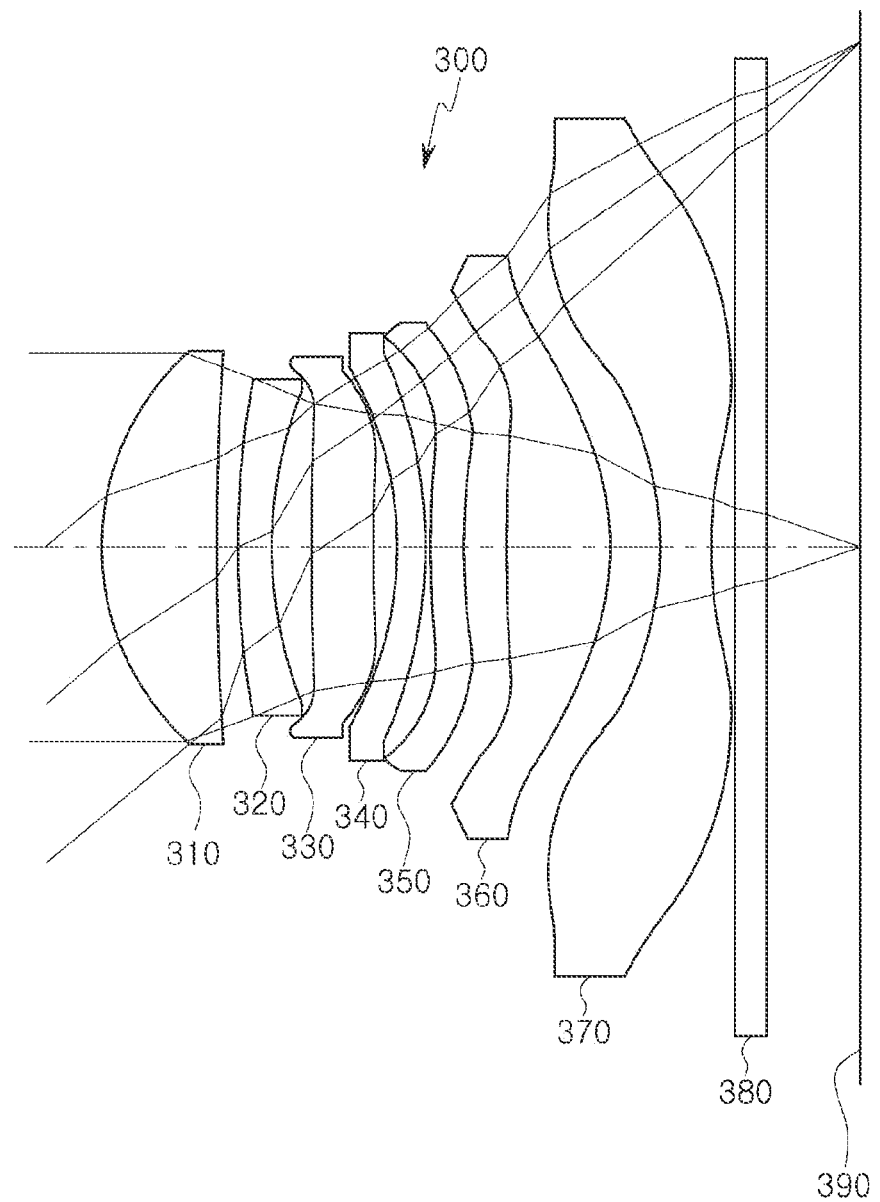
FIG. 5 is a diagram illustrating a third example of an optical imaging system.

A third example of an optical imaging system will be described with reference to FIG. 5.

The optical imaging system 300 may include a first lens 310, a second lens 320, a third lens 330, a fourth lens 340, a fifth lens 350, a sixth lens 360, and a seventh lens 370.

The first lens 310 may have positive refractive power, and may have a convex object-side surface and a concave image-side surface. The second lens 320 may have negative refractive power, and may have a convex object-side surface and a concave image-side surface. The third lens 330 may have positive refractive power, and may have a convex object-side surface and a concave image-side surface. The fourth lens 340 may have negative refractive power, and may have a concave object-side surface and a convex image-side surface. The fifth lens 350 may have positive refractive power, and may have a convex object-side surface and a concave image-side surface. The fifth lens 350 may have a shape in which an inflection point is formed on an object-side surface and an image-side surface of the fifth lens 350. The sixth lens 360 may have positive refractive power, and may have a convex object-side surface and a convex image-side surface. The sixth lens 360 may have a shape in which an inflection point is formed on an object-side surface and an image-side surface of the sixth lens 360. The seventh lens 370 may have negative refractive power, and may have a concave object-side surface and a concave image-side surface. The seventh lens 370 may have a shape in which an inflection point is formed on an object-side surface and an image-side surface of the seventh lens 370.

The optical imaging system 300 may further include a filter 380, an image sensor 390, and a stop ST. The filter 380 may be disposed between the seventh lens 370 and the image sensor 390, and the stop ST may be disposed between the first lens 310 and the second lens 320.

The optical imaging system 300 may include a plurality of lenses having relatively high refractive indexes. For example, the second lens 320, the fourth lens 340, and the fifth lens 350 may have a refractive index of 1.6 or higher.

Figure 6:
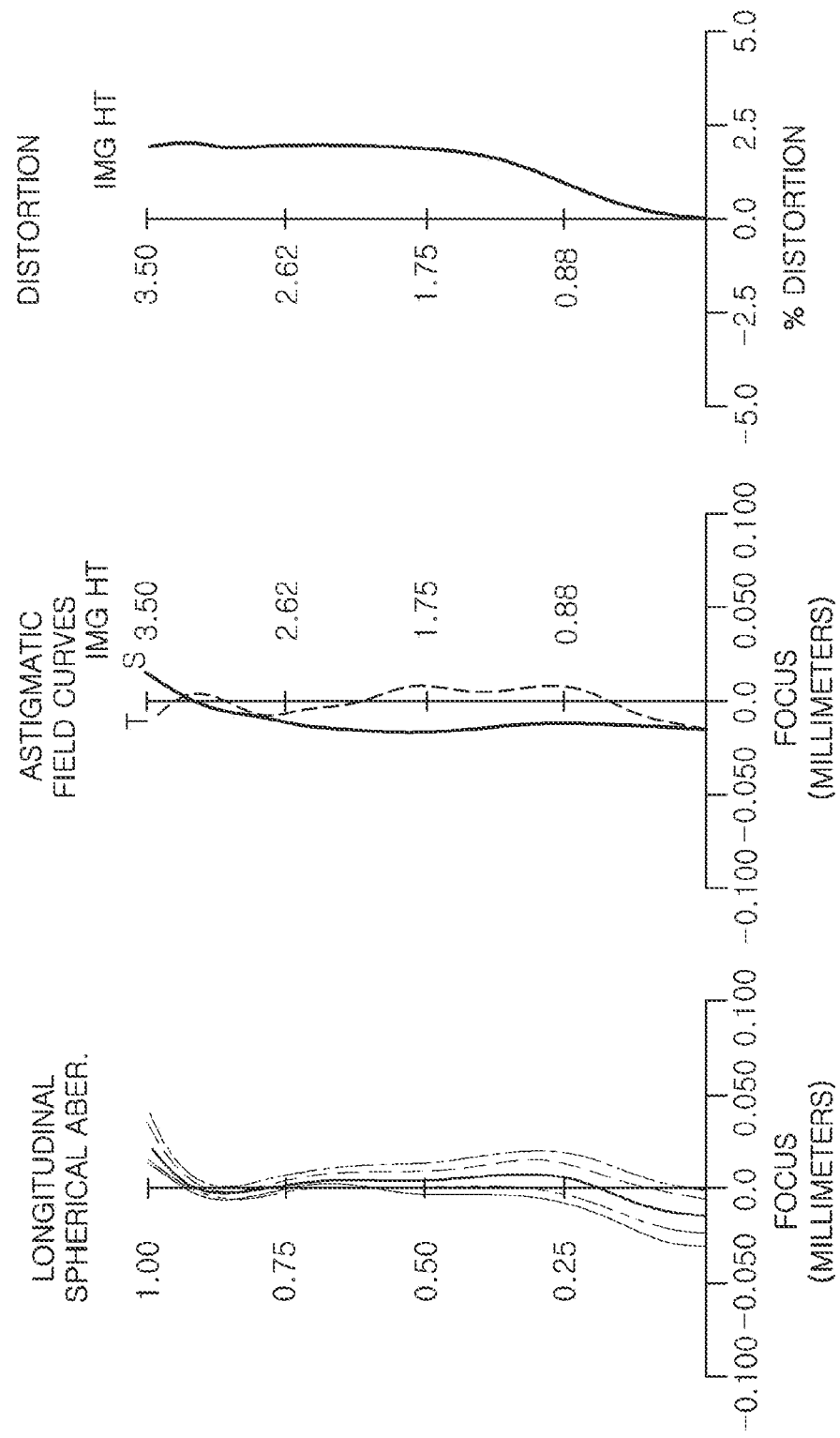
FIG. 6 illustrates aberration curves of the optical imaging system illustrated in FIG. 5.

The optical imaging system 300 may have aberration characteristics as illustrated in FIG. 6. Table 3 lists characteristics of the lenses of the optical imaging system 300. In the optical imaging system 300 of FIG. 5, a focal length is 4.230, and a total field of view is 78.1.

TABLE 3

| Surface No. | Note | Radius of Curvature | Thickness/ Distance | Refractive Index | Abbe No. | Focal Length |
|---|---|---|---|---|---|---|
| 1 | First Lens | 1.804 | 0.798 | 1.544 | 56.1 | 4.195062 |
| 2 | | 7.179 | 0.156 | | | |
| 3 (Stop) | Second Lens | 4.78881 | 0.210 | 1.671 | 19.25 | -11.75658 |
| 4 | | 2.938 | 0.320 | | | |
| 5 | Third Lens | 10.000 | 0.419 | 1.544 | 56.1 | 23.898276 |
| 6 | | 42.188 | 0.112 | | | |
| 7 | Fourth Lens | -5.865 | 0.210 | 1.633 | 23.9 | -14.74893 |
| 8 | | -15.698 | 0.041 | | | |
| 9 | Fifth Lens | 3.17781 | 0.255 | 1.651 | 21.5 | 100.586 |
| 10 | | 3.23227 | 0.293 | | | |
| 11 | Sixth Lens | 9.727 | 0.716 | 1.544 | 56.1 | 2.457922 |
| 12 | | -1.516 | 0.332 | | | |
| 13 | Seventh Lens | -3.605 | 0.350 | 1.544 | 56.1 | -2.122495 |
| 14 | | 1.766 | 0.169 | | | |
| 15 | Filter | Infinity | 0.210 | 1.517 | 64.2 | |
| 16 | | Infinity | 0.660 | | | |
| 17 | Imaging Plane | Infinity | | | | |

Figure 7:
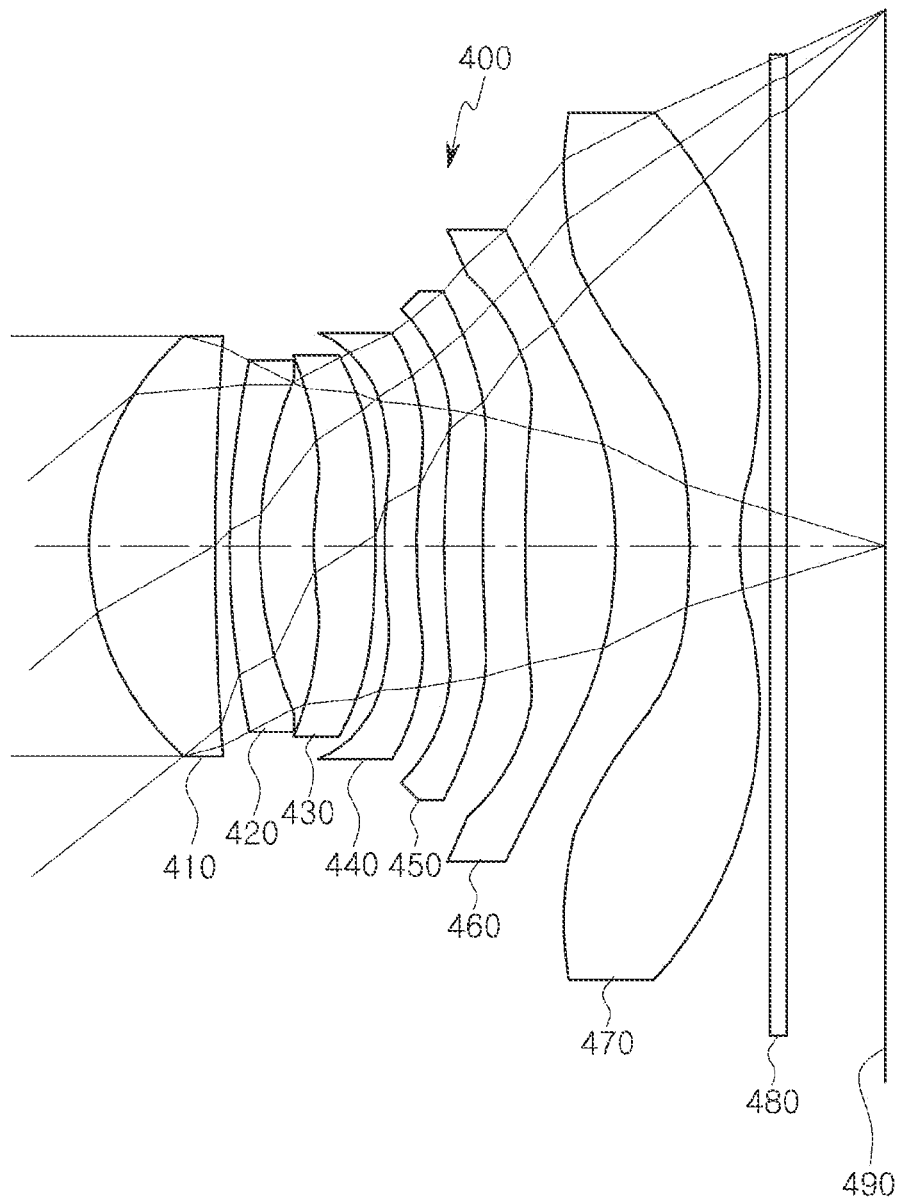
FIG. 7 is a diagram illustrating a fourth example of an optical imaging system.

A fourth example of an optical imaging system will be described with reference to FIG. 7.

The optical imaging system 400 may include a first lens 410, a second lens 420, a third lens 430, a fourth lens 440, a fifth lens 450, a sixth lens 460, and a seventh lens 470.

The first lens 410 may have positive refractive power, and may have a convex object-side surface and a concave image-side surface. The second lens 420 may have negative refractive power, and may have a convex object-side surface and a concave image-side surface. The third lens 430 may have positive refractive power, and may have a convex object-side surface and a concave image-side surface. The fourth lens 440 may have negative refractive power, and may have a convex object-side surface and a concave image-side surface. The fifth lens 450 may have positive refractive power, and may have a convex object-side surface and a concave image-side surface. The fifth lens 450 may have a shape in which an inflection point is formed on an object-side surface and an image-side surface of the fifth lens 450. The sixth lens 460 may have positive refractive power, and may have a convex object-side surface and a convex image-side surface. The sixth lens 460 may have a shape in which an inflection point is formed on an object-side surface and an image-side surface of the sixth lens 460. The seventh lens 470 may have negative refractive power, and may have a concave object-side surface and a concave image-side surface. The seventh lens 470 may have a shape in which an inflection point is formed on an object-side surface and an image-side surface of the seventh lens 470.

The optical imaging system 400 may further include a filter 480, an image sensor 490, and a stop ST. The filter 480 may be disposed between the seventh lens 470 and the image sensor 490, and the stop ST may be disposed between the first lens 410 and the second lens 420.

The optical imaging system 400 may include a plurality of lenses having relatively high refractive indexes. For example, the second lens 420, the fourth lens 440, and the fifth lens 450 may have a refractive index of 1.6 or higher.

Figure 8:
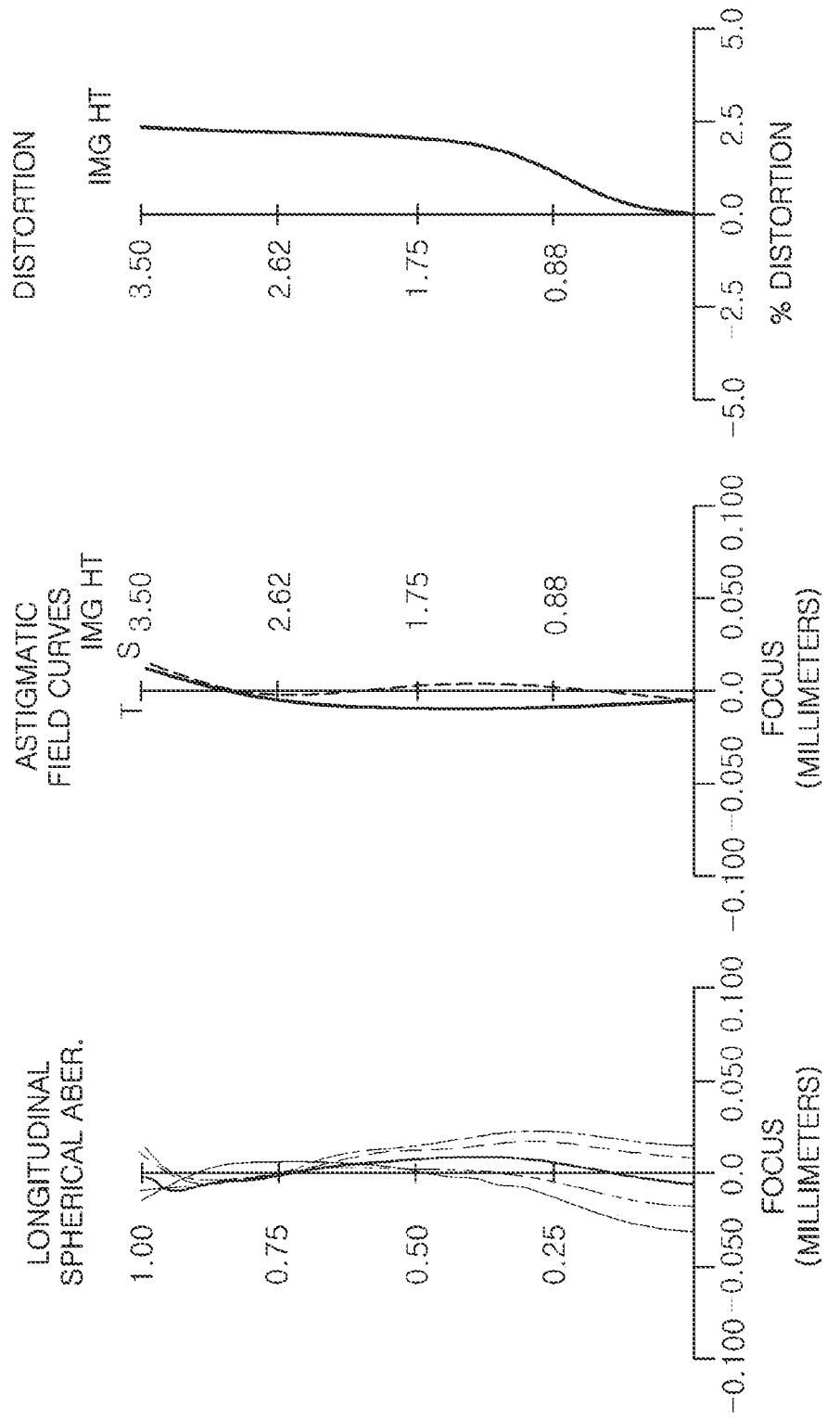
FIG. 8 illustrates aberration curves of the optical imaging system illustrated in FIG. 7.

The optical imaging system 400 may have aberration characteristics as illustrated in FIG. 8. Table 4 lists characteristics of the lenses optical imaging system 400. In the optical imaging system 400 of FIG. 7, a focal length is 4.30, and a total field of view is 77.5.

TABLE 4

| Surface No. | Note | Radius of Curvature | Thickness/ Distance | Refractive Index | Abbe No. | Focal Length |
|---|---|---|---|---|---|---|
| 1 | First Lens | 1.804 | 0.820 | 1.544 | 56.1 | 4.545884 |
| 2 | | 5.544 | 0.095 | | | |
| 3 (Stop) | Second Lens | 4.12697 | 0.200 | 1.671 | 19.25 | −16.00356 |
| 4 | | 2.930 | 0.361 | | | |
| 5 | Third Lens | 18.510 | 0.367 | 1.544 | 56.1 | 754.84395 |
| 6 | | 19.245 | 0.098 | | | |
| 7 | Fourth Lens | 5.245 | 0.210 | 1.657 | 20.4 | −44.71198 |
| 8 | | 4.389 | 0.183 | | | |
| 9 | Fifth Lens | 5.52469 | 0.254 | 1.613 | 26 | 1001.212 |
| 10 | | 5.47636 | 0.274 | | | |
| 11 | Sixth Lens | 7.190 | 0.560 | 1.544 | 56.1 | 3.038635 |
| 12 | | −2.097 | 0.488 | | | |
| 13 | Seventh Lens | −5.355 | 0.350 | 1.544 | 56.1 | −2.551526 |
| 14 | | 1.926 | 0.180 | | | |
| 15 | Filter | Infinity | 0.110 | 1.517 | 64.2 | |
| 16 | | Infinity | 0.640 | | | |
| 17 | Imaging Plane | Infinity | | | | |

Table 5 lists values of the conditional expressions of the optical imaging systems of the first to fourth examples.

TABLE 5

| Conditional Expressions | First Example | Second Example | Third Example | Fourth Example |
|---|---|---|---|---|
| f/f6 | 1.797 | 1.733 | 1.721 | 1.415 |
| V2 | 23.90 | 23.90 | 23.90 | 20.40 |
| F No | 1.580 | 1.580 | 1.580 | 1.580 |

TABLE 5-continued

| Conditional Expressions | First Example | Second Example | Third Example | Fourth Example |
|---|---|---|---|---|
| OAL/HFOV | 0.133 | 0.134 | 0.134 | 0.134 |
| Th7/Th6 | 0.567 | 0.525 | 0.489 | 0.625 |

The optical imaging system of the examples may have optical characteristics as discussed below. For example, a focal lengths of the optical imaging system may be within a range of 4.0 mm to 4.5 mm, a total length TTL may be within a range of 5.0 mm to 5.5 mm, a total field of view (FOV) may be within a range of 70° to 80°, a focal length of the first lens may be within a range of 4.0 mm to 5.0 mm, a focal length of the second lens may be within a range of −20 mm to −10 mm, a focal length of the third lens may be 18 mm or greater, a focal length of the fourth lens may be −8 mm or lower, a focal length of the fifth lens may be 50 mm or greater, a focal length of the sixth lens may be within a range of 2.0 mm to 4.0 mm, and a focal length of the seventh lens may be within a range of −3.0 mm to −1.5 mm.

According to the aforementioned examples, the optical imaging system may improve performance of a small-sized camera.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens having positive refractive power
a second lens having negative refractive power;

a third lens having positive refractive power and a convex object-side surface;
a fourth lens having negative refractive power;
a fifth lens having a refractive power;
a sixth lens having a refractive power and a convex object-side surface in a paraxial region thereof; and
a seventh lens having negative refractive power,
wherein the optical imaging system includes a total of seven lenses with refractive power and the first to seventh lenses are sequentially disposed from an object side to an imaging side,
wherein an absolute value of a radius of curvature of an object-side surface of the fifth lens is greater than an absolute value of a radius of curvature of an object-side surface of the fourth lens,
wherein an absolute value of a radius of curvature of an object-side surface of the third lens is greater than an absolute value of a radius of curvature of an image-side surface of the first lens,
wherein the second lens has a focal length within a range of −20.0 mm to −10.0 mm, and
wherein the third lens has a focal length equal to or greater than 18 mm.

2. The optical imaging system of claim 1, wherein the first lens has a convex object-side surface.

3. The optical imaging system of claim 1, wherein the second lens has a convex object-side surface.

4. The optical imaging system of claim 1, wherein the fourth lens has a concave object-side surface.

5. The optical imaging system of claim 1, wherein the fifth lens has a convex object-side surface.

6. The optical imaging system of claim 1, wherein the seventh lens has a concave object-side surface.

7. An optical imaging system, comprising:
a first lens having positive refractive power
a second lens having negative refractive power;
a third lens having a convex object-side surface;
a fourth lens having negative refractive power;
a fifth lens having a refractive power and a concave image-side surface in a paraxial region thereof;
a sixth lens having positive refractive power; and
a seventh lens having negative refractive power,
wherein the first to seventh lenses are sequentially disposed from an object side to an imaging side,
wherein an absolute value of a radius of curvature of an image-side surface of the seventh lens is greater than an absolute value of a radius of curvature of an object-side surface of the first lens,
wherein an absolute value of a radius of curvature of an object-side surface of the third lens is greater than an absolute value of a radius of curvature of an image-side surface of the first lens,
wherein the second lens has a focal length within a range of −20.0 mm to −10.0 mm, and
wherein $1.0 < f/f_6$, where f is a focal length of the optical imaging system and $f_6$ is a focal length of the sixth lens, and
wherein a distance from an image-side surface of the third lens to an object-side surface of the fourth lens along an optical axis is greater than a distance from an image-side surface of the first lens to an object-side surface of the second lens along the optical axis.

8. The optical imaging system of claim 7, wherein the first lens has a convex object-side surface.

9. The optical imaging system of claim 7, wherein the second lens has a convex object-side surface.

10. The optical imaging system of claim 7, wherein the fourth lens has a convex object-side surface.

11. The optical imaging system of claim 7, wherein the fifth lens has a convex object-side surface.

12. The optical imaging system of claim 7, wherein the sixth lens has a convex object-side surface.

13. The optical imaging system of claim 7, wherein the seventh lens has a concave object-side surface.

14. The optical imaging system of claim 1, wherein a distance from an image-side surface of the third lens to an object-side surface of the fourth lens along an optical axis is greater than a distance from an image-side surface of the first lens to an object-side surface of the second lens along the optical axis.

15. An optical imaging system, comprising:
a first lens having positive refractive power
a second lens having negative refractive power;
a third lens having a convex object-side surface;
a fourth lens having a refractive power;
a fifth lens having a refractive power and a concave image-side surface in a paraxial region thereof;
a sixth lens having positive refractive power; and
a seventh lens having negative refractive power,
wherein the first to seventh lenses are sequentially disposed from an object side to an imaging side,
wherein an absolute value of a radius of curvature of an image-side surface of the seventh lens is greater than an absolute value of a radius of curvature of an object-side surface of the first lens,
wherein an absolute value of a radius of curvature of an object-side surface of the third lens is greater than an absolute value of a radius of curvature of an image-side surface of the first lens,
wherein the second lens has a focal length within a range of −20.0 mm to −10.0 mm, and
wherein $1.0 < f/f_6$, where f is a focal length of the optical imaging system and $f_6$ is a focal length of the sixth lens, and
wherein a distance from an image-side surface of the third lens to an object-side surface of the fourth lens along an optical axis is greater than a distance from an image-side surface of the first lens to an object-side surface of the second lens along the optical axis.

* * * * *